(12) United States Patent
Seth et al.

(10) Patent No.: US 11,267,226 B2
(45) Date of Patent: Mar. 8, 2022

(54) FIRE RESISTANT BREATHABLE ROOFING UNDERLAYMENT

(71) Applicant: Avenex Coating Technologies, Inc., Richmond (CA)

(72) Inventors: Manish Seth, Burnaby (CA); Adem Chich, Kearney, NJ (US); Yunwa Wilson Cheung, Hillsborough, NJ (US)

( * ) Notice: Subject to any disclaimer, the term of this patent is extended or adjusted under 35 U.S.C. 154(b) by 0 days.

(21) Appl. No.: 16/409,754

(22) Filed: May 10, 2019

(65) Prior Publication Data

US 2019/0344543 A1 Nov. 14, 2019

Related U.S. Application Data

(60) Provisional application No. 62/669,424, filed on May 10, 2018.

(51) Int. Cl.
*B32B 15/14* (2006.01)
*B32B 15/20* (2006.01)
(Continued)

(52) U.S. Cl.
CPC .............. *B32B 15/14* (2013.01); *B32B 3/266* (2013.01); *B32B 5/022* (2013.01); *B32B 15/082* (2013.01);
(Continued)

(58) Field of Classification Search
CPC .... B32B 7/08; B32B 7/12; B32B 7/06; B32B 27/12; B32B 5/26; B32B 5/024; B32B 5/022; B32B 5/08; B32B 2262/14; B32B 2262/0253; B32B 2262/04; B32B 2262/0284; B32B 2262/0261; B32B 2262/101; B32B 2262/12; B32B 2307/718; B32B 2307/732; B32B 2307/7242; B32B 2307/3065; B32B 2307/748; B32B 2307/51; B32B 2307/71; B32B 2307/7265; B32B 2307/744; B32B 2255/205; B32B 2255/06; B32B 220/03; B32B 220/40; B32B 220/02; B32B 220/26; B32B 15/14; B32B 15/20; E04D 12/002; E04D 5/10; E04D 5/04
See application file for complete search history.

(56) References Cited

U.S. PATENT DOCUMENTS

2004/0081789 A1 * 4/2004 Kim .................... E04D 5/148
428/40.3
2004/0148887 A1 * 8/2004 Di Pede ................ E04D 5/10
52/408
(Continued)

FOREIGN PATENT DOCUMENTS

GB 2361485 A * 10/2001 .............. E04D 5/10

*Primary Examiner* — Michael Zhang
(74) *Attorney, Agent, or Firm* — Kevin Keener; Stephen Presutti

(57) ABSTRACT

A multi-layered breathable fire-resistant roofing underlayment is disclosed. The roofing underlayment has a core of aluminum foil. On each side of the aluminum foil is a layer of nonwoven material. A lamination coating is between the aluminum foil layer and the layers of nonwoven material. At the bottom of the roofing underlayment is a backside coating layer. The roofing underlayment has microperforations in one or more of the layers of material to permit airflow. The roofing underlayment may be utilized in bats or rolls.

10 Claims, 4 Drawing Sheets

(51) Int. Cl.
*B32B 3/26* (2006.01)
*B32B 15/085* (2006.01)
*B32B 15/082* (2006.01)
*B32B 27/32* (2006.01)
*B32B 27/30* (2006.01)
*B32B 27/12* (2006.01)
*E04D 5/10* (2006.01)
*E04D 5/04* (2006.01)
*B32B 5/02* (2006.01)

(52) U.S. Cl.
CPC ............ *B32B 15/085* (2013.01); *B32B 15/20* (2013.01); *B32B 27/12* (2013.01); *B32B 27/306* (2013.01); *B32B 27/32* (2013.01); *E04D 5/04* (2013.01); *E04D 5/10* (2013.01); *B32B 2255/02* (2013.01); *B32B 2255/06* (2013.01); *B32B 2255/26* (2013.01); *B32B 2307/51* (2013.01); *B32B 2307/71* (2013.01); *B32B 2307/7265* (2013.01); *B32B 2419/06* (2013.01)

(56) References Cited

U.S. PATENT DOCUMENTS

| | | | |
|---|---|---|---|
| 2010/0215924 A1* | 8/2010 | Di Pede | B32B 27/12 428/196 |
| 2011/0174509 A1* | 7/2011 | Quante | B32B 15/14 169/45 |
| 2012/0096791 A1* | 4/2012 | Cashin | B32B 5/024 52/309.1 |
| 2015/0354221 A1* | 12/2015 | Xiang Li | E04D 5/10 52/177 |
| 2017/0210100 A1* | 7/2017 | Leatherman | B32B 5/24 |

* cited by examiner

FIRE RESISTANT BREATHABLE ROOFING UNDERLAYMENT

PRIORITY

This application claims benefit to U.S. Provisional Patent Application Ser. No. 62/669,424, filed on May 10, 2018, the disclosure of which is hereby fully incorporated by reference.

FIELD OF THE INVENTION

This invention pertains generally to roofing underlayment and more particularly to a breathable heavy weight roofing underlayment.

BACKGROUND OF INVENTION

Synthetic roofing underlayments are used for replacement of asphalt felts. Synthetic underlayments offer various value added features including light weight, long exposure times, high tear strength, ease of installation and slip resistance. Traditionally, synthetic roofing underlayments are based on polypropylene and polyethylene coated multilayered structures. The structures can be based on woven, spunbond non-woven, polymeric films and combinations thereof. All these synthetic roofing underlayment products are either non-breathable or breathable. Synthetic underlayments are generally lightweight, thin, have high tensile, tear and burst strengths, and are superior to felts in UV resistance and resistance to drying and cracking over time.

Roofing underlayments are covered with various different type of coverings including Asphalt shingles, metal shingles, concrete tiles, clay tiles, cedar shakes, polymeric roof shingles and many others.

Therefore one of the most critical properties required by a roofing underlayment is to pass fire test of roofing system as required by Building code approvals. ASTM E108/UL 790 test is typically performed on roofing system including roofing underlayment and roof coverings to meet different fire ratings including Class A, B or C. Synthetic roofing underlayment alone does not meet Class A requirements especially when tested with lightweight asphalt roofing shingles and many other roof coverings. Therefore, there was a need in roofing industry to develop a synthetic roofing underlayment to pass Class A fire test consistently when tested with light weight asphalt roofing shingles Class A, Class B, or Class C and other roof coverings. Synthetic Underlayment could be Breathable or Non-breathable.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The invention is directed toward a multilayered roofing underlayment having a first layer of nonwoven material; a second layer of lamination coating adjacent to said first layer; a third layer of aluminum foil adjacent to said second layer; a fourth layer of lamination coating adjacent to said third layer; a fifth layer of nonwoven material adjacent to said fourth layer; a sixth layer of backside coating adjacent to said fifth layer; and wherein each of the first layer, second layer, and third layer contain a plurality of microperforations.

In another embodiment, the roofing underlayment has a first layer of nonwoven material; a second layer of laminating coating composed of ethylene-acrylic ester-maleic anhydride terpolymer adjacent to said first layer; a third layer of aluminum foil adjacent to said second layer; a fourth layer of adhesive adjacent to said third layer; a fifth layer of breathable polymeric film adjacent to said fourth layer; a sixth layer of adhesive adjacent to said fifth layer; and a seventh layer of nonwoven material adjacent to said sixth layer; wherein said first layer, second layer, and third layer contain a plurality of microperforations.

Still other embodiments of the present invention will become readily apparent to those skilled in this art from the following description wherein there is shown and described the embodiments of this invention, simply by way of illustration of the best modes suited to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

Various exemplary embodiments of this invention will be described in detail, wherein like reference numerals refer to identical or similar components, with reference to the following figures, wherein.

DETAILED DESCRIPTION OF THE PREFERRED EMBODIMENT

The claimed subject matter is now described with reference to the drawings. In the following description, for purposes of explanation, numerous specific details are set forth in order to provide a thorough understanding of the claimed subject matter. It may be evident, however, that the claimed subject matter may be practiced with or without any combination of these specific details, without departing from the spirit and scope of this invention and the claims.

A multilayered breathable roofing underlayment which has Aluminum foil, although other metal foils may be used, laminated to different layers that has the ability for roofing underlayment to pass Burning brand Class A fire test as per ASTM E108 even with Class B asphalt roofing shingles. The roofing underlayment will pass the intermittent flame test and burning brand test. The present disclosure further relates to other building products including housewrap, flashing products, and soundproofing underlayment.

Figure 1:
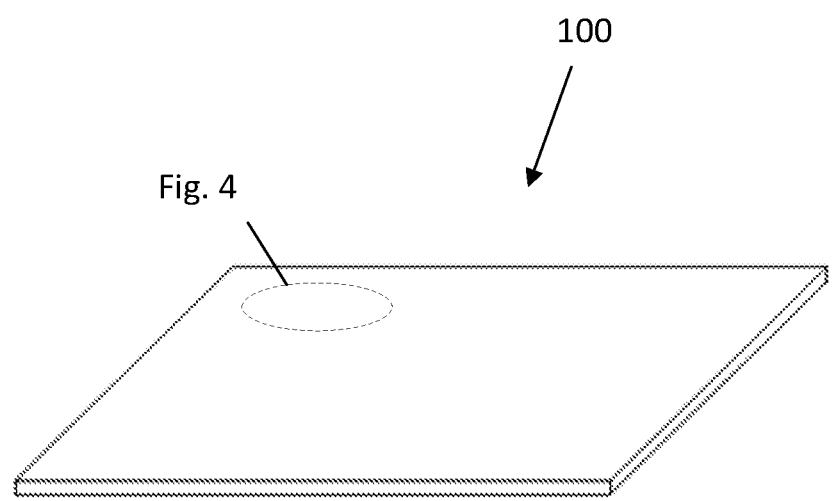
FIG. 1 is a perspective view of an underlayment sheet.

As shown in FIG. 1, the underlayment 100 is presented as a sheet of material. The underlayment 100 may be any size and shape and may be presented in bats or as a roll of sheeted material.

Figure 2:
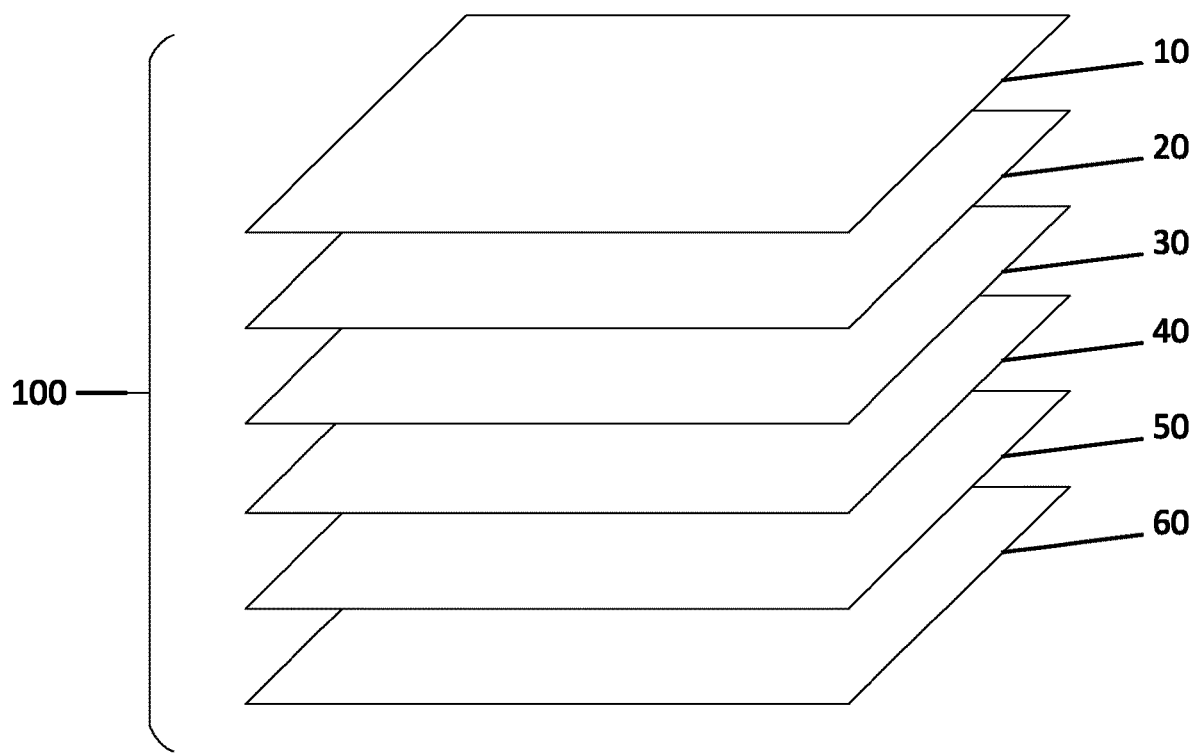
FIG. 2 is a an exploded view thereof.

As shown in FIG. 2, the underlayment 100 is comprised of multiple layers. In this embodiment the underlayment 100 is comprised of six layers. The first layer 10 is a nonwoven material, the second layer 20 is a lamination coating, the third layer 30 is aluminum foil, the fourth layer 40 is a breathable coating, the fifth layer 50 is nonwoven material, and the sixth layer is a breathable backside coating. The first layer 10, second layer 20, and third layer 30 are microperforated The aluminum foil third layer 30 may have any thickness but preferably has a thickness between 5 microns and 15 Microns.

The product weight of the underlayment may be any amount but preferably is set in the range of 90 gsm to 300 gsm.

The breathable underlayment could be a multilayered product structure which could be completely woven based, nonwoven based and their combination thereof.

The aluminum foil can be laminated to Woven and/or Nonwoven layers by using extrusion coating, adhesive spray lamination, hot melt adhesive, liquid primer coating, thermal lamination and/or an ultrasonic welding process.

In the preferred embodiment, specialty polymers are used to laminate Aluminum foil with different substrates including woven and nonwoven substrates. Specialty polymers used for lamination includes propylene based elastomers, ethyl methyl acrylate, ethyl vinyl acetate, thermoplastic polyolefin (TPO), terpolymers, reactive polyolefins including maleic anhydride or epoxide (glycidyl methacrylate), and blends thereof. Examples of specialty polymers includes Lotader 4210, Nucrel, and similar materials.

In the preferred embodiment the specialty polymer is an ethylene-acrylic ester-maleic anhydride terpolymer. The specialty polymer is 6.5% by weight of butyl acrylate and 3.6% by weight of maleic anhydride. The specialty polymer has a melting index (190° C./2.16 kg) of 10 g/10 minutes, a density of 0.94 g/cm3, a Vicat softening temperature of 69° C., a flexural modulus of 120 MPa, an elongation at break of 650%, a tensile strength at break of 10 MPa, and a hardness shore D of 46.

Hot melt adhesive can also be applied to laminate Aluminum foil with different substrates including woven and nonwoven materials. The adhesive may be applied to only a portion of the aluminum foil or may be applied to the entire sheet of aluminum foil.

Various substrates can be laminated to the retractable nonwoven during manufacturing to produce a multilayered roofing underlayment or other building product. For instance, woven fabrics, spunbound polypropylene nonwovens, melt blown nonwovens, needlepunch nonwovens, spunlace nonwovens, polyester nonwovens, polymeric films, glass mats, and combinations thereof can be laminated to the aluminum foil. Various different processes can be used to laminate Aluminum foil with other substrates, including extrusion coating, liquid primer coating, adhesive spray or slot die coating processes. Nonwovens may be calendared or embossed with different types of patterns.

Substrates can also be treated with Corona or Plasma treatment before lamination to achieve an excellent lamination bond strength.

Metallic powder or spray can be applied online on woven or nonwoven substrates.

Aluminum powder or spray can be applied online on woven or nonwoven substrates.

Figure 4:
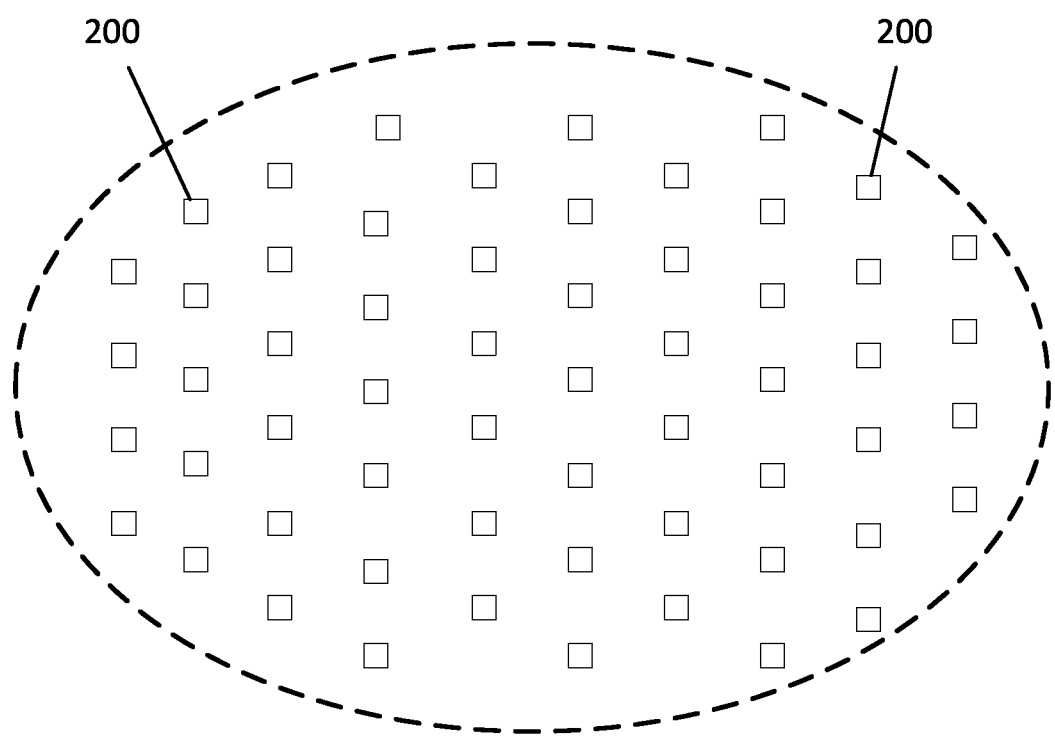
FIG. 4 is an enhanced view of the microperforations in the underlayment sheet.

The laminated substrate will be microperforated on a separate manufacturing step using a microperforated roll. As shown in FIG. 4, the layers of the roofing underlayment have microperforations 200. The microperforations 200 may be any size and shape and arranged in any configuration. The microperforations 200 may be in any or all of the layers of material Microrotations size will be in the range of 20 holes/sq inch to 300 holes/sq inch although the material may contain any number of holes per square inch.

The microperforated fabric will then be laminated to nonwoven fabric using breathable extrusion coating.

The breathable extrusion coating could be either monolithic coating comprised of copolyesters, polyamides, or any combinations thereof.

Microporous film can also be laminated using adhesive lamination process. The microporous film could be made using Calcium carbonate, talc, magnesium carbonate and their blends thereof.

The breathability of the finished product could be any amount but is preferably 5 perms to 150 perms when measured as per ASTM E-96 method B.

The breathable roofing underlayment would pass Class A fire test when tested as per ASTM E108.

The nonwoven material used in the product structure could be Textured/Embossed with any type of pattern.

The multilayered roofing underlayment of invention wherein the woven and nonwoven fabric comprises a material selected from the group consisting of polyolefins, polyethylene, polypropylene, polyester, fiberglass, nylon, rayon and blends thereof.

Woven fabrics that can be used for lamination to the retractable nonwoven material can include open weave leno scrim (1×1, 2×2, 3×3 or 4×4) or woven fabric with coverage ranging from 50% to 100% with pic count of 5×5 to 24×24. Woven fabrics used for lamination can be any polyolefin, including but not limited to, polyethylene, polypropylene, polyester (PET), fiberglass, nylon, rayon and blends thereof.

The woven fabric weight can be any amount but preferably is in the range of 10 gsm to 50 gsm.

The nonwoven may be a single layer and/or bi-component nonwoven. The retractable nonwoven can be used either alone or laminated with other substrates. The nonwoven fabric may have any weight but is preferably in the range of 10 gsm to 200 gsm.

The breathable coating weight may be any amount but preferably is in the range of 2 gsm to 30 gsm.

The lamination coating could be any weight but in the preferred embodiment is in the weight range of 2 gsm to 25 gsm.

Aluminum foil can also be laminated to Zip board system and make it system completely fire resistant. The underlayment or any other derivatives can be laminated directly to plywood, OSB, or any other board system and make the system completely fire resistant.

The multilayered roofing underlayment of this invention further comprises an adhesive layer (bitumen or PSA coating) adjacent to the bottom layer and a release sheet adjacent the adhesive layer, such that the multilayered roofing underlayment can be used as a peel and stick roofing underlayment.

The multilayered roofing underlayment can have a topside coefficient of friction of any amount but is preferably in the range of 0.4 to 1.4.

The multilayered roofing underlayment can have a backside coefficient of friction of any amount but is preferably in the range of 0.4 to 0.99.

The multilayered roofing underlayment of this invention has a high strength to weight ratio, elastic properties, UV resistance and an excellent water resistance.

The water resistance coating or lamination coating will always be applied and could be a blend of polypropylene, polyethylene, specialty polymers, UV stabilizers, color masterbatch, polymer tackifiers, elastomers and their combinations thereof.

The multilayered roofing underlayment can be used as a facer sheet for the production of a peel and stick roofing underlayment. The multilayered roofing underlayment can alternatively be used in other applications including, but not limited to, housewrap, vapor barriers, industrial packaging, geomembranes, flashing and soundproofing underlayments.

The roofing material may be made in any configuration. As illustrated in the drawings, there may be a six layered design. In this embodiment the top layer is a nonwoven material, the second layer is a lamination coating, the third layer is Aluminum foil, the fourth layer is breathable lamination coating, the fifth layer is nonwoven material, and the sixth layer is breathable backside coating.

In another embodiment of the six layer material, the top layer is a nonwoven material, the second layer is lamination coating, the third layer is Aluminum foil, the fourth layer is lamination coating, the fifth layer is woven material, and the sixth layer is backside coating.

In another embodiment the roofing material is a five layered design. In this embodiment the top layer is a topside coating, the second layer is a woven material, the third layer is a lamination coating, the fourth layer is aluminum foil, and the fifth layer is backside coating.

Figure 3:
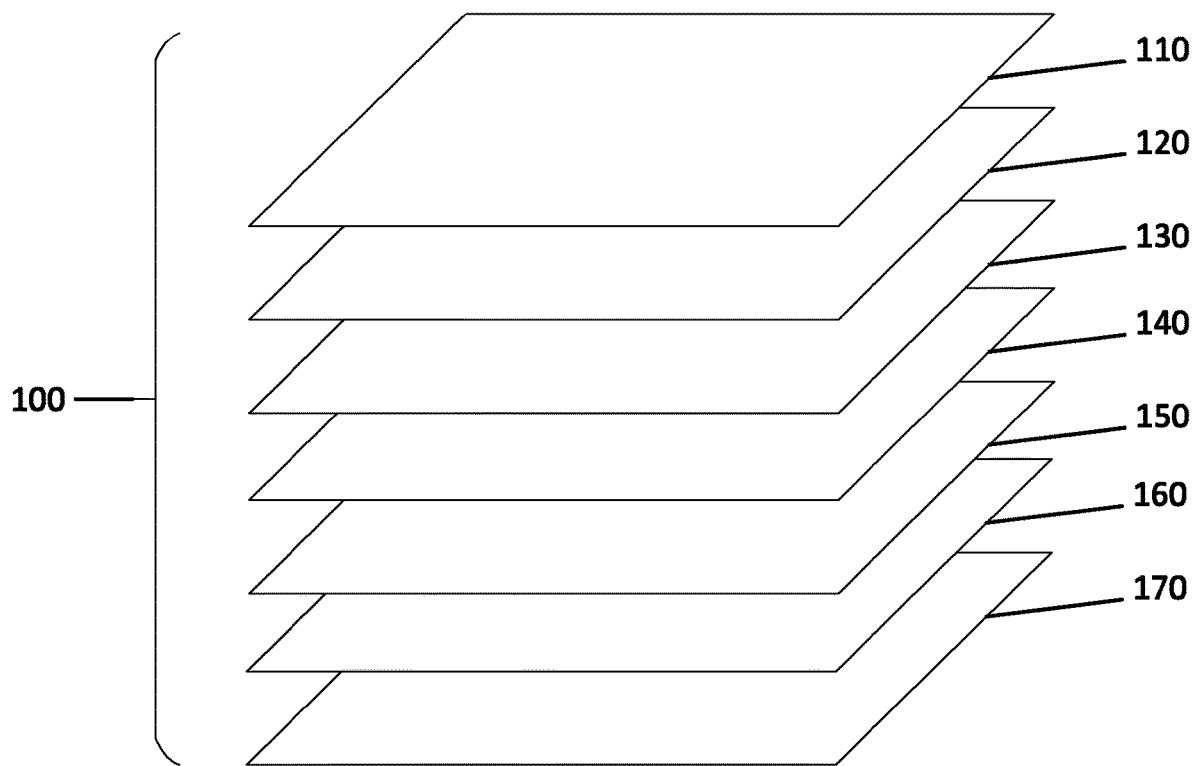
FIG. 3 is an exploded view of another embodiment of the underlayment sheet.

As shown in FIG. 3, in another embodiment the roofing material has seven layers. In this embodiment the first layer 110 is a nonwoven material, the second layer 120 is lamination coating, the third layer 130 is aluminum foil, the fourth layer 140 is adhesive, the fifth layer 150 is breathable film, the sixth layer 160 is adhesive, and the seventh layer 170 is a nonwoven material. Any number of layers may have microperforations but in the preferred embodiment the top three layers are microperforated.

The material may be manufactured in any number of ways. The aluminum coating may be applied directly to the woven or nonwoven fabric. The application of the aluminum coating may be done using vacuum metallization (VM) and/or physical vapor deposition (PVD) process. There may also be a high temperature resistant coating such as an aluminum-silicone alloy coating applied to the nonwoven or woven material directly. An aerogel composite made from silica aerogels and additives and can be used to laminate the nonwoven or woven fabric. In another embodiment the aluminum foil is replaced with tin foil.

Aluminum micronized powder can be applied directly to Nonwoven as a replacement to Aluminum foil during lamination process using either of the manufacturing processes.

Aluminum foil or powder can also be imbedded in Nonwoven itself during the nonwoven manufacturing process.

There may be any number of layers in the roofing material. In the preferred embodiment there are between three to eight layers in the roofing material.

Backside coating may be any type of material but in the preferred embodiment will be a special polymer coating including propylene based elastomers, ethyl methyl acrylate, ethyl vinyl acetate, thermoplastic polyolefin (TPO), maleic anhydride or epoxide (glycidyl methacrylate) and blends thereof.

In another embodiment of the invention, the roofing underlayment 100 has a delustered metallic surface applied to nonwoven. The delustered metal may be applied as a coating in a single piece or in multiple pieces, such as strips extending along the length or square or hexagon shaped pieces positioned against one another. The delustering process may be performed online or offline during the extrusion process. The delustering can be done on product with the strips or pieces being spaced anywhere from 0.1 mm to 2 mm apart.

In another embodiment the underlayment 100 has a contiguous fully-bonded metallic layer that is embedded into the nonwoven material. The metallic layer may be embedded into any of the nonwoven layers of material. The material may then be calendared. In this way, the resulting underlayment 100 presents both a breathable material which allows air flow to pass through, due mainly to the microperforations, yet is fire resistant due to the metallic material utilized in the roofing underlayment 100.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:
1. A multilayered roofing underlayment comprising
  a) a first layer of nonwoven material;
  b) a second layer of lamination coating adjacent to said first layer;
  c) a third layer of aluminum foil adjacent to said second layer;
  d) a fourth layer of breathable coating adjacent to said third layer;
  e) a fifth layer of nonwoven material adjacent to said fourth layer,
  f) a sixth layer of breathable coating adjacent to said fifth layer;
  wherein said first layer, said second layer, and said third layer each contain a plurality of microperforations; and
  wherein said multilayered roofing underlayment is sufficiently fire resistant to meet the standards under ASTM E108/UL 790 for Class A requirements when used with class A or class B shingles;
  wherein said first layer of nonwoven material has a product weight greater than 25 grams per square meter and equal to or less than 150 grams per square meter;
  wherein said third layer of aluminum foil has a thickness from 5 microns to 15 microns;
  wherein said third layer of aluminum foil has microperforations in the range of 20 holes/sq inch to 300 holes/sq inch; and wherein the breathability of the multilayered roofing underlayment is between 5 perms to 150 perms when measured as per ASTM E-96 method B.

2. The multilayered roofing underlayment as in claim 1 wherein said second layer of lamination coating is composed of one or more specialty polymers selected from a group consisting of: propylene elastomer, ethyl methyl acrylate, ethyl vinyl acetate, thermoplastic polyolefin, maleic anhydride, and glycidyl methacrylate.

3. The multilayered roofing underlayment as in claim 1 wherein said fourth layer of breathable coating is composed of one or more specialty polymers selected from a group consisting of: propylene elastomer, ethyl methyl acrylate, ethyl vinyl acetate, thermoplastic polyolefin, maleic anhydride, and glycidyl methacrylate.

4. The multilayered roofing underlayment as in claim 1 wherein said sixth layer of breathable coating is composed of one or more specialty polymers selected from a group consisting of: propylene elastomer, ethyl methyl acrylate, ethyl vinyl acetate, thermoplastic polyolefin, maleic anhydride, and glycidyl methacrylate.

5. The multilayered roofing underlayment as in claim 1 further comprising a top side, wherein said top side has a coefficient of friction greater than or equal to 0.4 and less than 0.8.

6. The multilayered roofing underlayment as in claim 5 further comprising a back side, wherein said back side has a coefficient of friction greater than or equal to 0.4 and less than 0.8.

7. The multilayered roofing underlayment as in claim 6 wherein said second layer of lamination coating is composed of one or more specialty polymers selected from a group consisting of: propylene elastomer, ethyl methyl acrylate, ethyl vinyl acetate, thermoplastic polyolefin, maleic anhydride, and glycidyl methacrylate.

8. The multilayered roofing underlayment as in claim 7 wherein said fourth layer of breathable coating is composed of one or more specialty polymers selected from a group consisting of: propylene elastomer, ethyl methyl acrylate, ethyl vinyl acetate, thermoplastic polyolefin, rnaleic anhydride, and glycidyl methacrylate.

9. The multilayered roofing underlayment as in claim 8 wherein said sixth layer of breathable coating is composed of one or more specialty polymers selected from a group consisting of: propylene elastomer, ethyl methyl acrylate, ethyl vinyl acetate, thermoplastic polyolefin, maleic anhydride, and glycidyl methacrylate.

10. A multilayered roofing underlayment comprising
a) a first layer of nonwoven material having product weight greater than 25 grams per square meter and equal to or less than 150 grams per square meter;
b) a second layer of lamination coating adjacent to said first layer;
c) a third layer of tin foil adjacent to said second layer, the third layer having a thickness between 5 microns and 15 microns, the third layer having microperforations in the range of 20 holes/sq inch to 300 holes/sq inch;
d) a fourth layer of breathable coating adjacent to said third layer;
e) a fifth layer of nonwoven material adjacent to said fourth layer,
f) a sixth layer of breathable coating adjacent to said fifth layer;
g) wherein said first layer, said second layer, and said third layer each contain a plurality of microperforations;
h) wherein said multilayered roofing underlayment is sufficiently fire resistant to pass the ASTM E108/UL 790 for Class A requirements when used with class A or class B shingles;
i) further comprising a top side, wherein said top side has a coefficient of friction greater than or equal to 0.4 and less than 0.8;
j) further comprising a back side, wherein said back side has a coefficient of friction greater than or equal to 0.4 and less than 0.8; and
k) wherein the breathability of the multilayered roofing underlayment is between 5 perms to 150 perms when measured as per ASTM E-96 method B.

\* \* \* \* \*